March 24, 1964 E. J. OLIVIERI 3,125,904
INDEXING FIXTURE
Filed March 7, 1962 2 Sheets-Sheet 1
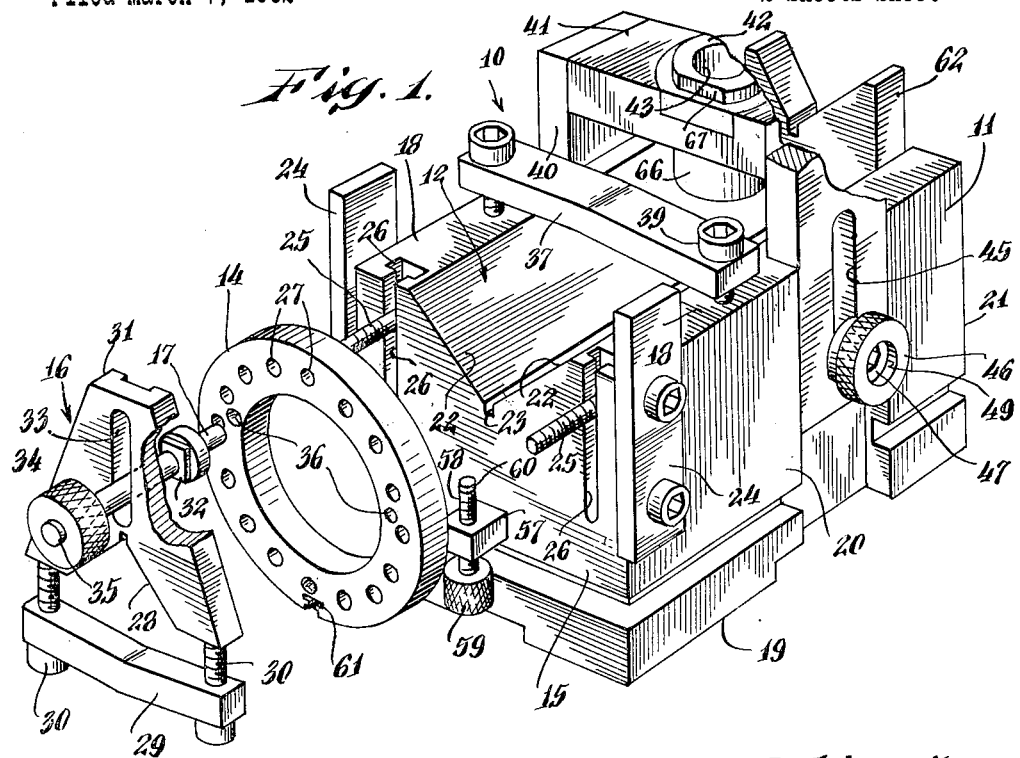
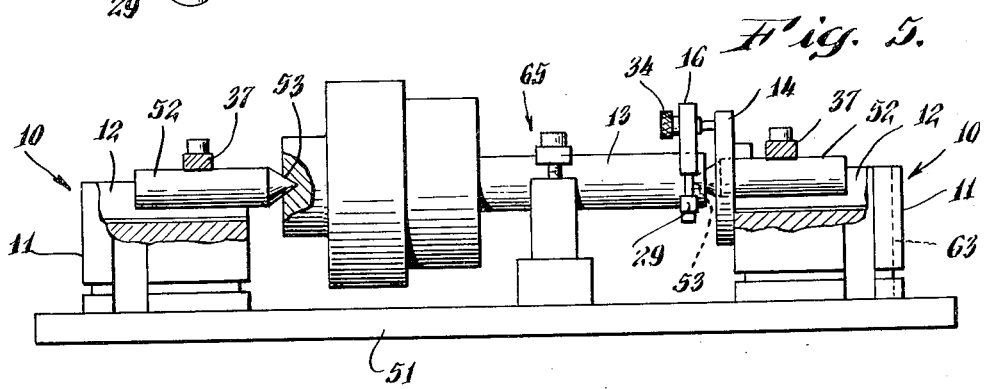
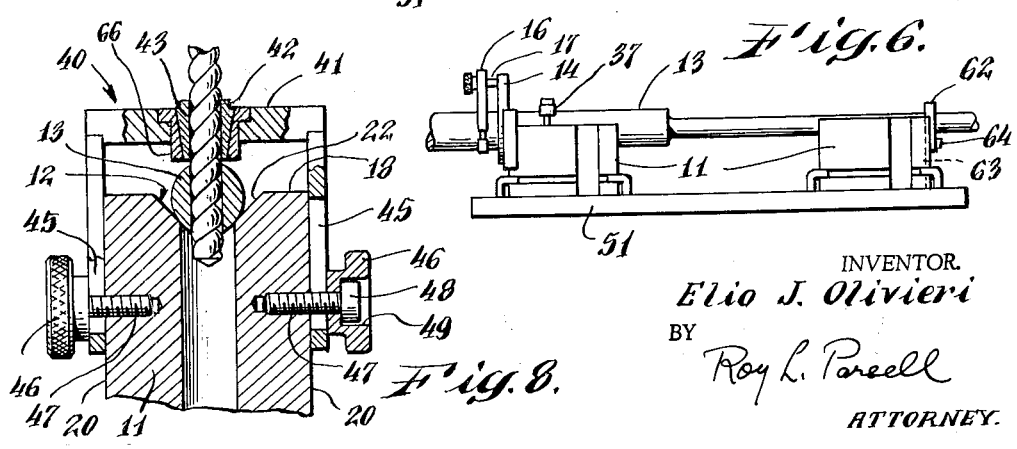
INVENTOR.
Elio J. Olivieri
BY Roy L. Parcell
ATTORNEY.

March 24, 1964    E. J. OLIVIERI    3,125,904
INDEXING FIXTURE
Filed March 7, 1962    2 Sheets-Sheet 2
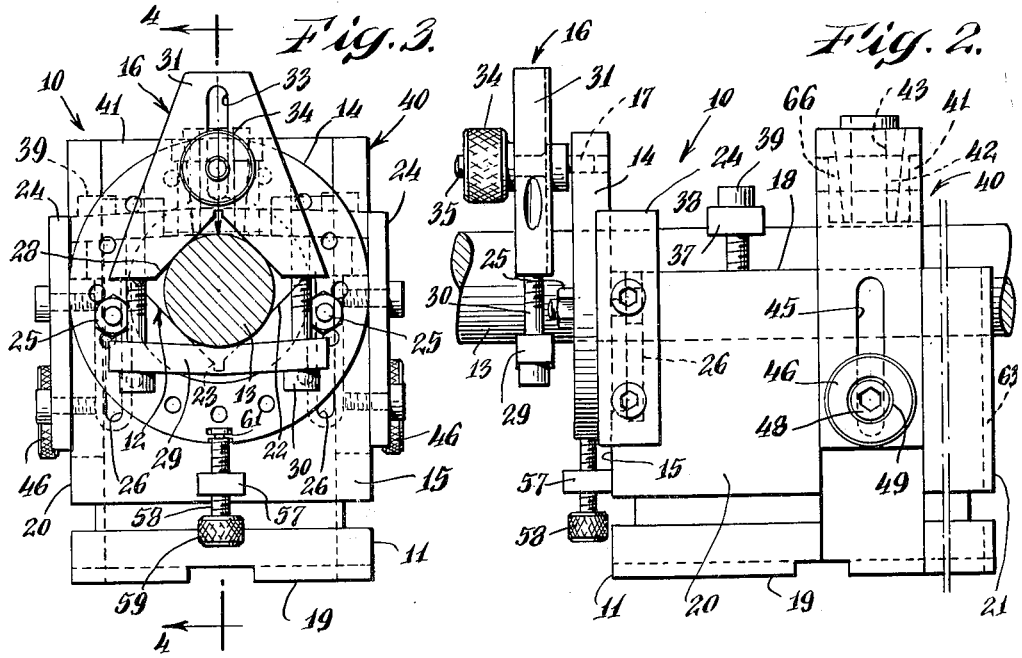
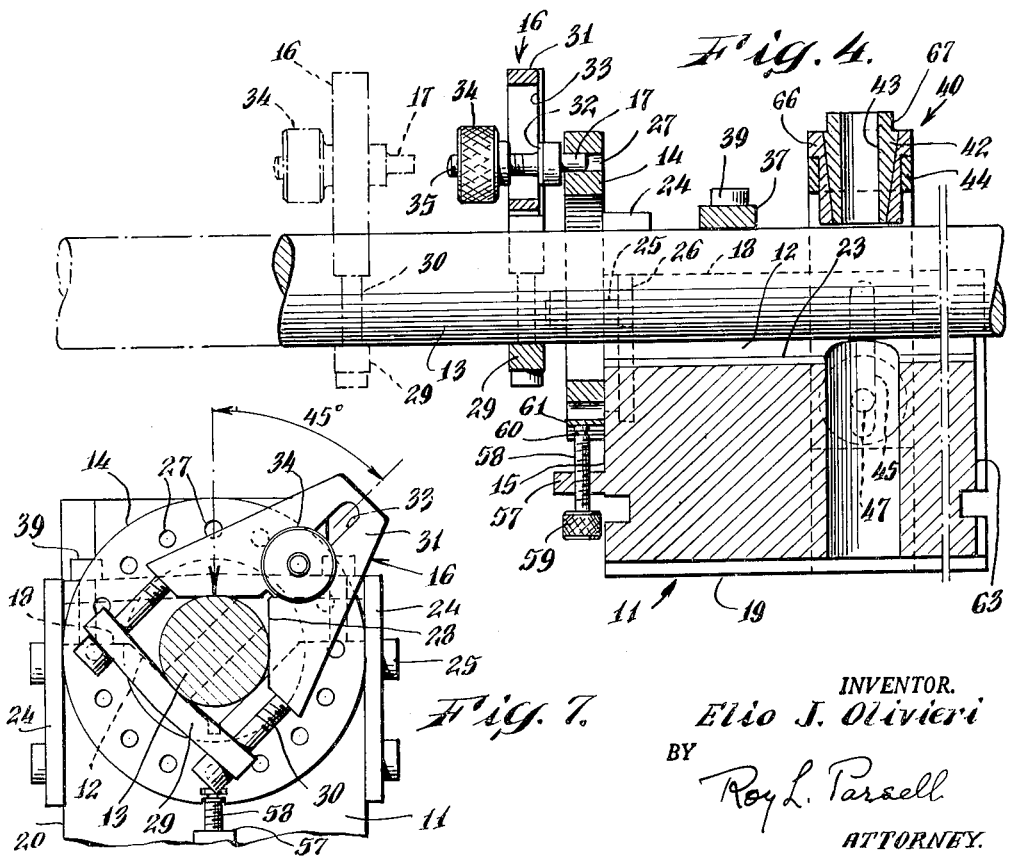
INVENTOR.
Elio J. Olivieri
BY
Roy L. Parsell
ATTORNEY.

United States Patent Office 3,125,904
Patented Mar. 24, 1964

3,125,904
INDEXING FIXTURE
Elio J. Olivieri, 330 Welton St., Hamden, Conn.
Filed Mar. 7, 1962, Ser. No. 178,135
5 Claims. (Cl. 77—64)

This invention relates to a work holder and in particular to a tool maker's or machinist's indexing work holding fixture adapted for substantially cylindrical pieces.

In tool room and machine shop practice, individual pieces of work generally require a series of material or metal removing operations such as drilling, milling, grinding and the like, the location or results of which often bear definite angular relation to each other or to a base reference point or both.

It is an object of this invention to provide the proper fixture for this sort of work which will firmly support the work under the stress of the material removing operations.

It is another object of this invention to provide means for quickly and accurately rotating the work through a predetermined angle or to a predetermined position to present a new area for removing material.

It is still another object to provide quick and easy means for securing and releasing this work from its support.

Other objects and a better understanding of the invention may be had by referring to the following description and claims, taken in conjunction with the accompanying drawings in which:

FIG. 1 is a top and end view in perspective of this device;

FIG. 2 is a longitudinal elevation;

FIG. 3 is an elevation at the dial end;

FIG. 4 is a section taken in line 4—4 of FIG. 3;

FIG. 5 is a schematic view showing another embodiment;

FIG. 6 is a schematic view showing still another embodiment;

FIG. 7 is similar to FIG. 3 but showing work indexed to another station;

FIG. 8 is a vertical transverse section through the center of yoke showing schematically work in place being drilled.

With reference to the drawings, the numeral 10 designates the general fixture comprising a rectangular block member 11 having an open ended longitudinal channel or V slot 12 for receiving a cylindrical work 13. An index dial 14 is slidably mounted on one end face 15 of block member 11. The work 13 protrudes through the center of the index dial 14 to enable an arm 16 to be clamped thereto. This arm carries an index finger 17 which cooperates with the index dial 14 to position the work 13 at any desired angular position as will be described in more detail hereinafter together with related features.

The main support for the work 13 comprises a rectangular block member 11 with its top 18 and bottom 19, sides 20 and one end 21 accurately machined and ground in order to present surfaces which are parallel or perpendicular to each other respectively. A longitudinal channel or V slot 12 is cut into the top side 18 of the block 11 having smooth surfaces 22 accurately ground in planes 90 to each other and perpendicular to the end face 15 of the block 11 to receive the work 13. A notch 23 at the bottom of the channel 12 permits grinding of the surfaces 22 and provides a clearance space for any dirt which might tend to collect in the channel 12. It will thus be obvious that a cylindrical work 13 placed in the channel 12 will always have its axis parallel to the bottom surface 19 of the block 11 and perpendicular to the end face 15 of block member 11.

The index dial 14 is slidably attached to the end face 15 of the block member 11 by means of vertical guides 24 fixed to the block member 11 adjacent the end 21 and locking bolts 25 secured in vertical T slots 26 cut into the end 21 of the block 11 serve to anchor dial 14 when in the desired position. The guides 24 also serve to maintain the locus of the center of the index dial always in a vertical plane bisecting the angle formed by the surfaces 22 of the V slot 12 and consequently the locus of the axis of the work 13. The index station holes 27 in the index dial 14 are equally spaced throughout the entire 360° of the circle and the number of holes depend on the desired angular spacing desired for the work. The invention permits the use of a variety of station spaced index dials.

The arm 16 may be secured to the work 13 by any suitable clamping means, the preferred method comprising a V notch 28 in one end of the arm 16 to receive the work 13 and a cross bar 29 to maintain the work 13 in the V notch 28, the cross bar 29 being held in position by means of two bolts 30.

At the opposite end 31 of the arm 16 is an index finger 17 slidable in a radial slot 33 in the arm 16 which cooperates with station holes 27 in the index dial 14 to position the work 13 at any desired angle relative to the vertical plane bisecting the channel 12 or to position the rotation of the work 13 relative to a given reference as may be desired. A knurled knob 34 is threaded to the outer end 35 of the index finger 17 to secure the finger 17 at the desired radius from the axis of the work 13 to cooperate with the station holes 27 in the index dial 14. Adjacent the inner end of the index finger 17 and integral therewith is an enlarged diameter having a transverse lug 32 (FIG. 1) which cooperates with slot 33 in arm 16 to prevent index finger 17 from rotating when knurled knob 34 is turned to secure finger 17 to arm 16 or release same.

A hold down clamp serves to hold the work 13 in position in the V slot 12 comprising a strap 37 bearing against the longitudinal surface of the work 13 and is secured to the top side 18 of the block 11 by means of bolts 39 threaded to the block member 11.

For purposes of guiding a tool, as for example, a drill bit which will operate to remove material from the work 13, the block member 11 is equipped with a vertically sliding yoke having vertical legs 40 which carry the cross member 41, having a bushing 42 whose central opening 43 is of a diameter to cooperate with the desired drill bit diameter. In the preferred form, the outside 44 of the bushing 42 is tapered to fit a corresponding taper in a liner 66 fitted into the cross member 41 as shown clearly in FIG. 8. Both the bushing 42 and the liner 66 are hardened and ground. The liner is secured in the cross member 41 by any suitable means, as, for example, a press fit. The taper surfaces between bushing 42 and liner 66 are sufficient to hold bushing in place without the need of a clamping screw or like means. A flat notch 67 on the top of the bushing assists in its removal.

The yoke may be secured to the block member 11 by means of bolts 47 passing through the slots 45 in the vertical legs 40 respectively and provided with clamping knobs 46. The outer end of each bolt 47 is provided with an enlarged head 48 which is hexagonally recessed to receive a corresponding hexagonal wrench generally known as an Allen wrench for tightening bolt 47 into block member 11.

Each clamping knob 46 has a counterbore 49 in its outer surface 50 to receive the enlarged head 48 of the bolt 47. When it is desired to remove the bolt 47, the clamping nut 46 is unscrewed until its counterbore 49 seats against the inside of the enlarged head 48 of the bolt 47 and then still turning the clamping nut 46 in the same direction, the bolt 47 will unscrew thus eliminating a second use of the Allen wrench.

Protruding from the face 15 of the block member 11 is a lug 57 having a threaded aperture to receive a threaded bolt 58. This bolt 58 is provided with a knurled knob 59 at its lower end and at its upper end with a circumferential groove 60. The lower periphery of the dial 14 is provided with a T slot 61 which cooperates with the groove 60 in the bolt 58 whereby vertical movement of bolt 58 moves dial 14 to align the center of the dial with the axis of the work 13 when the knob 59 is rotated as desired.

In using the invention as embodied in FIGURES 1 through 4 and FIGURES 7 and 8, cylindrical work is placed in the channel 12 with one end protruding through the center of the index dial 14.

The dial is moved vertically by turning the bolt 58 until the center of the dial aligns with the axis of the work 13. The dial 14 is then secured to member 11 by means of locking bolts 25.

The work 13 is initially positioned as desired and the index arm 16 placed on the work with its index finger 17 in the desired station hole 27 as shown, for example, in FIG. 3. Then the index arm 16 is secured to the work 13 by tightening the clamping bolts 30.

If desired, the work 13 may be secured in the channel 12 by means of the strap 37 which rests on the work 13 and is bolted to the member 11 by means of bolts 39.

After the particular desired material removing operation has been finished and the work is ready to be indexed for a subsequent operation, the hold down strap 37 is released if it has been previously used and then the index arm 16 is rotated, together with the work, to the next predetermined station as shown, for example, in FIG. 7. The hold down strap 37 is again secured if desired and the work is ready for the next material removing operation.

In the case of work 13 having different diameters, a supplementary rest 62 may be used which is secured to the end of the member 11 by any desired means such as a guide groove, not shown, and a bolt, not shown.

In another embodiment of this invention where a long piece of work is involved, two fixtures 10 may be used as shown in FIG. 6 in which case the index dial 14 may be removed from one of the blocks and preferably both blocks 11 are mounted on a common base plate 51.

In still another embodiment as shown in FIG. 5 where the diameter of the work 13 may vary or for purposes of inspecting the work, two fixtures 10 are mounted on a bed plate 51 spaced along a common axis. Centers 52 are placed in channels 12, respectively, and secured by cross bars 37 bolted to members 11. Work 65 is provided with center holes 53 which receive centers 52 for mounting between fixtures 11 respectively. If desired, the dial 16 may be removed from one of the fixtures 10 and indexing accomplished by the other fixture 10. When it is desired to secure the work 13 against movement clamping means 65 of any appropriate form is mounted on bed plate 51.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. In an indexing fixture for containing substantially cylindrical work, a work support comprising a V-block for holding such work along the external surface of such work; an indexing dial having a concentric opening for receiving a portion of such work and indexing stations arranged circumferentially on said dial; said dial mounted on one end of said support vertically slidable to align said central opening concentrically with the axis of such work reposing in said support, means for detachably clamping said dial to said support against relative movement therebetween; an indexing crank having clamping means to detachably secure said crank to the outside surface of a portion of such work adjacent to and concentrically aligned in said central opening and having retaining means on the arm of said crank to hold said crank at one of said stations to maintain such work in the desired indexed angular position thereof relative to such work axis.

2. In the device of claim 1 in combination means for adjusting said dial into concentric alignment with the axis of such work comprising, a lug extending outward from the end of said support below said dial having a threaded aperture; a screw bolt engaging the threads in said aperture and rotatively engaging said dial whereby rotation of said bolt will move said dial vertically into said alignment.

3. In an indexing fixture for containing substantially cylindrical work for drilling; a member comprising a channel having oblique sides and an open end for supporting such work therein; an indexing dial having a concentric opening for receiving a portion of such work and indexing stations arranged circumferentially on said dial; said dial mounted on one end of said member vertically slidable to align said opening concentrically with the axis of such work resposing in said channel; means for detachably clamping said dial to said member against relative movement therebetween; an indexing crank having clamping means to detachably secure said crank to the outside surface of a portion of such work adjacent to and concentrically aligned in said central opening and having retaining means on the arm of said crank to hold said crank at one of said stations to position such work; a vertical slidable transverse yoke mounted on said member in clamping relation thereto above said channel; said yoke having an aperture directed toward such work reposing in said channel; a liner in said aperture having a central tapered opening therein; a drill bushing detachably mounted in said central tapered opening and having an outside taper corresponding thereto; means on said bushing for loosening same preparatory to removing same from said aperture.

4. In the device of claim 3 means on said bushing for loosening same comprising a vertical flat face.

5. In an indexing fixture for holding work generally elongated along a central axis, an elongated base member; a spaced aligned pair of work supporting V-blocks mounted on a longitudinal axis of said base member; a dead center reposing in each V-block positioned and detachably clamped thereto in alignment to receive a work piece rotatable on said centers; an indexing dial having indexing stations arranged circumferentially thereon mounted on one of said V-blocks, and having a concentric opening for receiving a portion of an adjacent center; said dial vertically slidable to align said opening with the axis of said center, means for detachably clamping said dial to said V-block; an indexing crank having clamping means to detachably secure said crank to a portion of such work adjacent to said dial and having retaining means on the arm of said crank to hold said crank at one of said stations to maintain such work in the desired indexed angular position thereof relative to the axis of such work.

References Cited in the file of this patent

UNITED STATES PATENTS

| | | |
|---|---|---|
| 804,325 | Kaplan | Nov. 14, 1905 |
| 1,045,633 | Swainson-Brooke | Nov. 26, 1912 |
| 1,891,953 | Sellers | Dec. 27, 1932 |
| 2,242,792 | Panzer | May 20, 1941 |
| 2,424,485 | Miller | July 22, 1947 |
| 2,587,923 | Sulger | Mar. 4, 1952 |

FOREIGN PATENTS

| | | |
|---|---|---|
| 416,576 | Germany | July 20, 1925 |